United States Patent
Riddiford et al.

(10) Patent No.: US 6,361,128 B1
(45) Date of Patent: Mar. 26, 2002

(54) METHOD FOR CONTROLLING A VALVE IN A HYDRAULIC BRAKING SYSTEM

(75) Inventors: Bryan Peter Riddiford, Dayton; John Benjamin Hageman; Donald Edward Schenk, both of Vandalia, all of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/345,620

(22) Filed: Jun. 30, 1999

(51) Int. Cl.⁷ .............................................. B60T 13/16
(52) U.S. Cl. .................................. 303/115.2; 303/162
(58) Field of Search ................................ 303/155, 156, 303/151, 157, 166, 162, 115.2, 113.4, 11, 89, 116.1, 116.2, 113.3, 114.3

(56) References Cited

U.S. PATENT DOCUMENTS

| | | |
|---|---|---|
| 4,513,780 A | 4/1985 | Evans |
| 4,830,333 A | 5/1989 | Watson |
| 4,860,794 A | 8/1989 | Parrott et al. |
| 4,902,075 A | 2/1990 | Uno et al. |
| 4,940,294 A | 7/1990 | Foster |
| 4,940,295 A | 7/1990 | Adachi et al. |
| 5,005,919 A | 4/1991 | Shuey et al. |
| 5,018,798 A | 5/1991 | Parker et al. |
| 5,150,951 A | 9/1992 | Leiber et al. |
| 5,302,008 A | 4/1994 | Miyake et al. |
| 5,403,075 A * | 4/1995 | Fujioka .................... 303/116.1 |
| 5,403,077 A | 4/1995 | Burgdorf et al. |
| 5,437,501 A * | 8/1995 | Kohno et al. ............ 303/116.2 |
| 5,445,447 A | 8/1995 | Farr et al. |
| 5,490,721 A | 2/1996 | Bartell et al. |
| 5,499,805 A | 3/1996 | Anma |
| 5,499,865 A * | 3/1996 | Katagiri et al. .......... 303/116.2 |
| 5,593,216 A | 1/1997 | Hosoya et al. |
| 5,597,214 A | 1/1997 | Katagiri et al. |
| 5,603,483 A | 2/1997 | Reuter et al. |
| 5,669,679 A | 9/1997 | Hammoud et al. |
| 5,749,633 A | 5/1998 | Baumgartner |
| 5,752,749 A * | 5/1998 | Lee ......................... 303/115.2 |
| 5,806,939 A | 9/1998 | Feigel et al. |

* cited by examiner

Primary Examiner—Matthew C. Graham
(74) Attorney, Agent, or Firm—Robert M. Sigler

(57) ABSTRACT

Improved control for a hydraulic system useful in automotive braking applications, particularly in dry interface automotive braking applications, includes the use of a valve for holding pressure in a hydraulic system constant while relieving the pressure load on the pressure source. Preferably, the valve is a normally-open solenoid valve that is closed and opened in response to a desired pressure being sensed at a pressure actuated mechanism, such as a brake caliper. The use of the improved control for a hydraulic system improves brake response times during ABS applications, and increases the energy efficiency and life expectancy of the pressure providing motor.

4 Claims, 4 Drawing Sheets

METHOD FOR CONTROLLING A VALVE IN A HYDRAULIC BRAKING SYSTEM

TECHNICAL FIELD

The present invention relates to hydraulic systems, and more specifically, to solenoid controlled hydraulic braking systems for automobiles.

BACKGROUND

Hydraulic systems typically are the basis for vehicle braking systems, especially automotive braking systems. The ability of a hydraulic system to convert fluid pressure into linear/mechanical motion, and to allow the source of the hydraulic pressure to be positioned remotely from the cylinders which effect the braking action, is particularly desirable in automotive systems. Such automotive braking systems are hydraulic throughout, consisting of an actuator, such as a brake pedal, a reservoir of fluid responsive to pressure applied by the actuator, such as a master cylinder, and means for converting the hydraulic pressure to the braking force, such as cylinders. Thus, in these standard systems, braking pressure has been achieved mechanically, utilizing the force of the depression of the brake pedal by the driver (usually accompanied by a vacuum boost) that consequently increases the pressure in the master cylinder. The increased pressure in the master cylinder is then transmitted through lines of fluid to the cylinders which operate the calipers or shoes, thereby forcing the calipers and shoes against the rotors or drums, respectively, to slow the automobile.

Motor-based antilock braking systems ("ABS") are frequently used with standard all hydraulic braking systems in order to prevent vehicle skidding during "panic" braking events. In commonly used motor-based ABS, a motor/piston assembly is used to modulate the fluid pressure to the calipers during ABS braking events to quickly cycle the brakes between apply and release modes. In a typical ABS, a wheel speed sensor senses when individual wheels on a vehicle begin to "lock-up" (i.e. cease rotation) during braking, which is an indication that those vehicle wheels are beginning to skid. Vehicle skidding is undesirable in that the vehicle stopping distance could be lengthened and vehicle control is lessened. Accordingly, in order to minimize skidding, the ABS modulates hydraulic fluid flow to the vehicle wheel brakes that are about to lock up, thereby causing such brakes to alternate between applying braking pressure and releasing braking pressure in a controlled manner at a high rate to optimize tire slip without allowing the wheels to lock-up.

However, during ABS operation, there is an undesirable lag in response time in the braking system due to the back pressure of the hydraulic fluid in the system that is placed on the motor. In other words, the motor does not respond as quickly as desired in resetting to a neutral position or in reversing direction in response to a signal received from the brake control requesting a change in pressure to the calipers. While some of this response lag is caused by the inertia inherently present in the motor itself, most of the problem is attributable to the back pressure of the hydraulic fluid on the internal components of the motor. Thus, motor response and or resetting lag times could be decreased, and overall ABS control improved, if the pressure load on the ABS motor was relieved as the motor is commanded by the controller to go from release to reapply. Also, by closing the solenoid and limiting the pressure to the calipers during transition from apply to release, the motor turn around time could be reduced by deadheading the motor and eliminating pressure overshoot at the wheel brake.

While control improvements such as these are useful in controlling the pressure load on ABS motors in standard all hydraulic systems, there are additional disadvantages of standard systems that are not solved by merely improving hydraulic control. Some of these disadvantages include the large amount of mass and volume that the master cylinder and the hydraulic lines add to the completed automobile. Furthermore, the number of assembly hours that are required to install standard hydraulic braking systems when combined with the large number of parts that these systems generally require, further adds to their expense and undesirability. Other disadvantages of standard hydraulic braking systems is their dependence on vacuum boost to assist in the braking operations due to the advent of vehicles, such as electric cars, which do not produce vacuum as a by-product of the vehicle operation.

Accordingly, there have been recent advances in standard hydraulic braking technology using "brake-by-wire" technology to overcome some of these disadvantages. In particular, a subset of "brake-by-wire" systems known as "dry interface" systems has been found to be particularly useful. In a typical dry interface system, the driver input is transmitted to the system electronically through an electronic controller, rather than mechanically and hydraulically, to the braking devices at each corner. The corner is a term used in the industry to describe all of the equipment that is used at the wheel assembly, including, but not limited to, the braking, suspension, and drive train systems. These new dry interface systems ameliorate several of the aforementioned disadvantages of standard hydraulic braking systems. In particular, dry interface systems improve on standard braking systems in performance, vehicle design, assembly, and repair areas. For example, the elimination of an all-hydraulic braking system means that hydraulic lines are no longer necessary to convey brake fluid from the master cylinder to the corners of the automobile, thereby eliminating a significant amount of mass from the automobile. Furthermore, assembly costs are reduced since dry interface systems consist of individual modules having relatively few separate components. The dry interface modules merely need to be bolted to the automobile and plugged in, in contrast to the significant assembly time required for the installation of standard, fully-hydraulic braking systems. The reliability of the systems is thereby increased accordingly.

While such dry interface systems eliminate many of the hydraulic components of the standard hydraulic systems, it should be noted that these systems are not completely "dry." Unlike standard hydraulic systems, which utilize vacuum-assisted driver brake pedal force to create the pressure to apply the brakes, the dry interface system utilizes individual motors that drive ballscrew piston assemblies at each corner to create the necessary hydraulic pressure for applying the brake pressure at that corner. Accordingly, while assembly costs are reduced, there is still a lag in ABS braking response time due to the pressure load that is placed on each ballscrew piston motor by the hydraulic back pressure of the system. Thus, as with ABS braking in standard hydraulic braking systems, ABS response times would be greatly improved in dry interface braking systems if the pressure load on the motor could be controlled during ABS apply and reapply modes.

Thus, given the above-noted disadvantages of prior art automobile braking systems, it is desirable to have a hydraulic control system that is highly responsive to driver braking input and that controls pressure load on a motor during ABS braking events to improve the hydraulic system response time.

SUMMARY OF THE INVENTION

The present invention is an improved control for a hydraulic system. While the improved control disclosed herein is useful in many hydraulic system applications, it is particularly useful in automobile braking systems. The improved control of the present invention preferably includes the use of a normally-open solenoid valve that closes when a desired pressure is sensed in the associated hydraulic system. The closing of the normally-open solenoid valve holds the pressure at the wheel brake assembly at a desired level while simultaneously relieving pressure load on the motor being used to create the hydraulic pressure during a release cycle and deadheading the motor on an apply cycle, which may be the ABS motor in standard braking systems or the ballscrew piston motor in dry interface systems. The control of the pressure load allows the motor to return more quickly to a neutral position, which allows the system to reset more quickly. Accordingly, the use of the normally-open solenoid in this application increases the efficiency, accuracy and system response of the hydraulic braking operation.

Additionally, the improved control of the present invention is also useful for relieving motor load during long, constant brake pressure stops, such as those that occur at a stoplight, thereby lowering the motor current requirement. This increases the electrical efficiency of the system, which is particularly useful in electric vehicles, and reduces motor wear. Further, the improved control of the present invention is useful for holding brake pressure constant in specialty situations such as hill holder braking applications.

In one embodiment of, the present invention, a normally-open solenoid is combined with a motor-driven ballscrew and piston assembly in a dry interface braking system in order to achieve greater control of the brake apply and release cycles during ABS braking. Additionally, in a preferred embodiment, the solenoid can be used to lower wear on the motor and decrease the amount of energy required to keep the brakes in an applied position during long stops. In this embodiment, the normally-open solenoid valve is located between the hydraulic output to the brake calipers and the ballscrew piston assembly. Accordingly, the pressure of the hydraulic fluid applied to the calipers can be held constant by closing the solenoid valve when a desired pressure is detected by a pressure sensor. Thus, by coordinating the operation of the solenoid valve with the driver input and/or ABS system using an electronic controller, the desired pressure at the brake assembly can be maintained while pressure load on the ballscrew piston motor is varied.

In an alternate embodiment, a normally-open solenoid valve is used in a standard all hydraulic braking system with motor-based ABS. The solenoid is positioned between the master cylinder and the brake calipers. The solenoid is then actuated between on and off positions to assist the motor that is used to modulate apply and release cycles during ABS braking in order to improve response times in a similar manner as described above with respect to dry interface systems. Additionally, the solenoid valve may be closed in hill holder situations to hold the pressure to the brakes constant when this situation is sensed by the braking system.

It should be noted that while almost any solenoid valve, or even other types of fluid valves, may be used to regulate fluid flow to a pressure actuated mechanism in accordance with the present invention, it is preferred to use a quick acting valve which minimizes fluid flow impedance during "open" times. Accordingly, by using a fast-acting, low-flow impedance valve, the hydraulic system response is optimized.

An exemplary control sequence of a vehicle braking event illustrating one use of the improved control for a hydraulic system of the present invention in a dry interface braking system is as follows. First, a signal is sent to the electronic brake controller indicating whether or not the automobile is moving. If the signal indicates that the automobile is moving, the brake controller determines if ABS is active. If ABS is active, the brake controller sends a signal indicating the condition of the ABS hold. If the ABS hold is active, meaning that the brake controller is sensing a condition wherein it is desired that brake pressure be held constant, the solenoid valve is closed to maintain the current pressure at the brakes. Then a signal is sent to the ballscrew piston motor to reverse motor direction until the motor is returned to a neutral position. The routine is then exited and started again. However, if the brake controller senses that ABS hold is not active, the brake controller regulates current to the ballscrew piston motor while the solenoid remains open, thereby pressuring the brakes to a desired output. The routine is then exited and started again.

In contrast, if the initial signal received by the brake controller indicates that the automobile is not moving, the status of the driver braking command is checked. If the driver braking command is constant, the solenoid valve is closed, thus holding the brake pressure at the desired constant level. The ballscrew piston motor is then turned off and the routine is exited and started again.

Accordingly it is an object of the present invention to provide an improved control for a hydraulic system, an improved control suitable for automotive vehicle braking systems, that is highly responsive to driver braking input, that controls pressure load on a motor/actuator during ABS braking events, and that improves the hydraulic system response time.

Other objects and advantages of the present invention will be apparent from the following description, the accompanying drawings, and the appended claims.

DESCRIPTION OF THE PREFERRED EMBODIMENT

Figure 1:
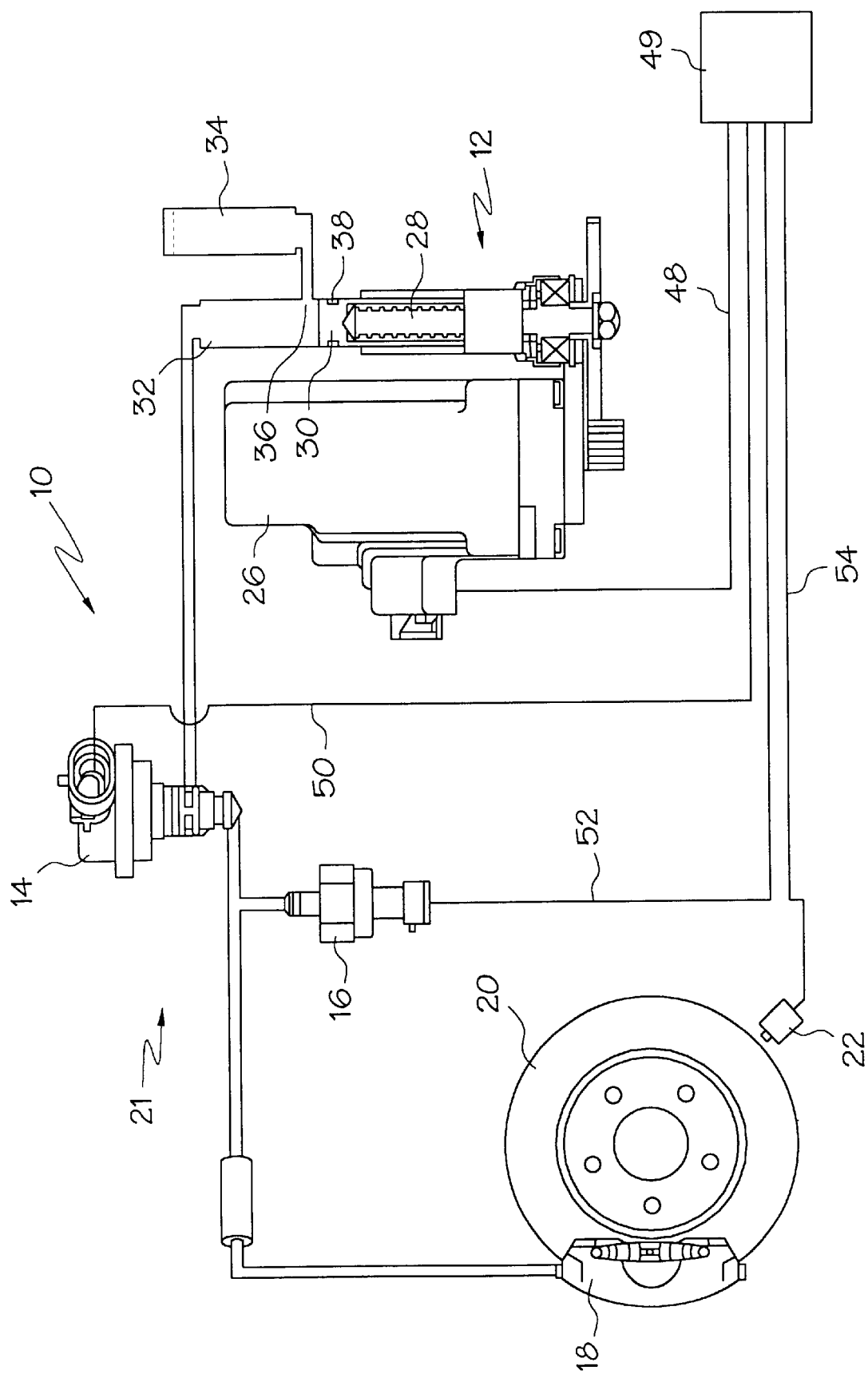
FIG. 1 is a schematic of a preferred embodiment of the control for a hydraulic system of the present invention used in a dry interface braking system.

As shown in FIG. 1, in a preferred embodiment, the control for a hydraulic system of the present invention may be incorporated in a dry interface braking system, generally designated 10. The dry interface braking system 10 consists of a ballscrew piston assembly 12, a normally-open solenoid valve 14, a pressure transducer 16, brake calipers 18, a rotor 20, and a wheel speed sensor 22. The ballscrew piston assembly 12 is in fluid communication with the normally-open solenoid valve 14 which is in turn in fluid communication with the pressure transducer 16 and the brake calipers 20, all of which comprise the hydraulic system 21. The ballscrew piston assembly 12 provides hydraulic force to close the calipers 18 on the rotor 20 in order to stop an associated vehicle.

The ballscrew piston assembly 12 consists primarily of an actuator motor 26, a ballscrew 28, a piston 30, a cylinder 32, and a hydraulic fluid reservoir 34 which is in fluid communication with the cylinder 32 through by-pass hole 36. In a preferred embodiment, the by-pass hole 36 for the hydraulic fluid reservoir 34 feeds into the cylinder 32 just above the released (neutral) position for the piston 30. This location for the fluid by-pass hole 36 is preferable in that when the piston 30 is at rest, and no braking force is requested from an automobile driver, fluid from the reservoir 34 communicates with the cylinder 32 and to the rest of the hydraulic system 21. This insures that the hydraulic system 21 does not hold any residual pressure when the piston 30 is fully released and fluid is available to compensate for lining wear. However, when the actuator motor 26 is actuated in response to driver input requesting braking force (i.e., the driver depresses the brake pedal), the piston 30 is translated forward in the cylinder 32, thereby preventing pressure leak out of the hydraulic system as well as preventing additional hydraulic fluid in the reservoir 34 from entering the hydraulic system 21. A seal 38 is seated around the piston 30 and is positioned so that seal 38 passes over the by-pass hole 36 at the beginning of an apply mode. Accordingly, by blocking the fluid reservoir 34 by-pass hole 36 with the piston 30 in this manner during braking apply modes, pressure in the hydraulic system 21 can be regulated to desired levels.

Figure 2:
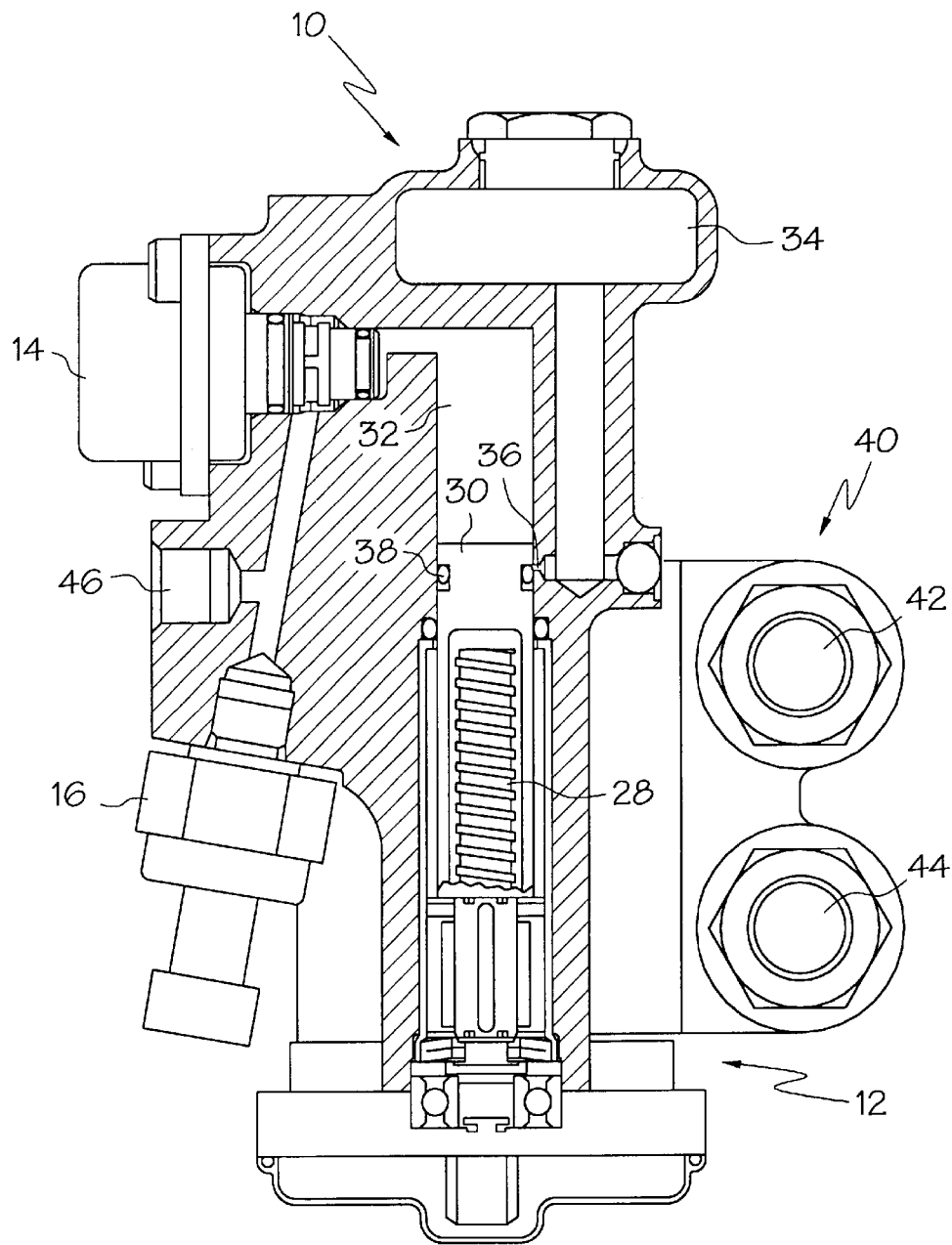
FIG. 2 is a side elevational view in section of a ballscrew piston assembly and normally-open solenoid valve for use with the dry interface braking system of FIG. 1.
Figure 3:
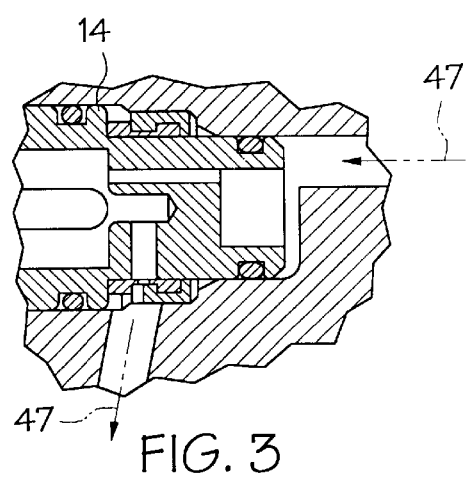
FIG. 3 is a detail side elevational view in section of the normally-open solenoid valve of FIG. 2.

As shown best in FIG. 2, a dry interface braking system 10 utilizing the control for a hydraulic system in accordance with the present invention is preferably built in a modular configuration. This is beneficial in that assembly of the braking system by the OEM (original equipment manufacturer) is simplified, thereby lowering overall production costs. Accordingly, the dry interface braking system 10 preferably includes a mounting bracket 40 that is bolted to the automobile by mounts 42, 44. The modular configuration includes the ballscrew piston assembly 12 as well as the normally-open solenoid valve 14 and the pressure transducer 16. The hydraulic pressure generated by the system 10 is transferred to the brake calipers 18 (see FIG. 1) through the hydraulic outlet 46. As seen best in FIG. 3, the flow path 47 for the hydraulic fluid through the normally-open solenoid 14 is somewhat circuitous, however, this configuration is highly beneficial in providing very quick solenoid valve 14 response times, thus improving overall braking control. This configuration also prevents undesirable fluid leak-back through the valve 14 during valve closed times.

As mentioned previously, the control of the dry interface braking system 10 is accomplished electronically, rather than hydraulically, as in standard braking systems. Accordingly, as best shown in FIG. 1, driver braking input is transmitted first to a brake controller, such as an electronic controller 49 and then to the ballscrew piston assembly 12 and the normally-open solenoid valve 14 via electrical connections 48 and 50, respectively. The brake controller also receives input electronically from the pressure transducer 16 and the wheel sensor 22 via electrical connections 52 and 54, respectively. Thus, by interpreting the input received from the driver, the pressure transducer 16, and the wheel speed sensor 22, the brake controller sends coordinated signals to the normally-open solenoid valve 14 and the ballscrew piston assembly 12 to achieve the desired braking result.

Figure 4:
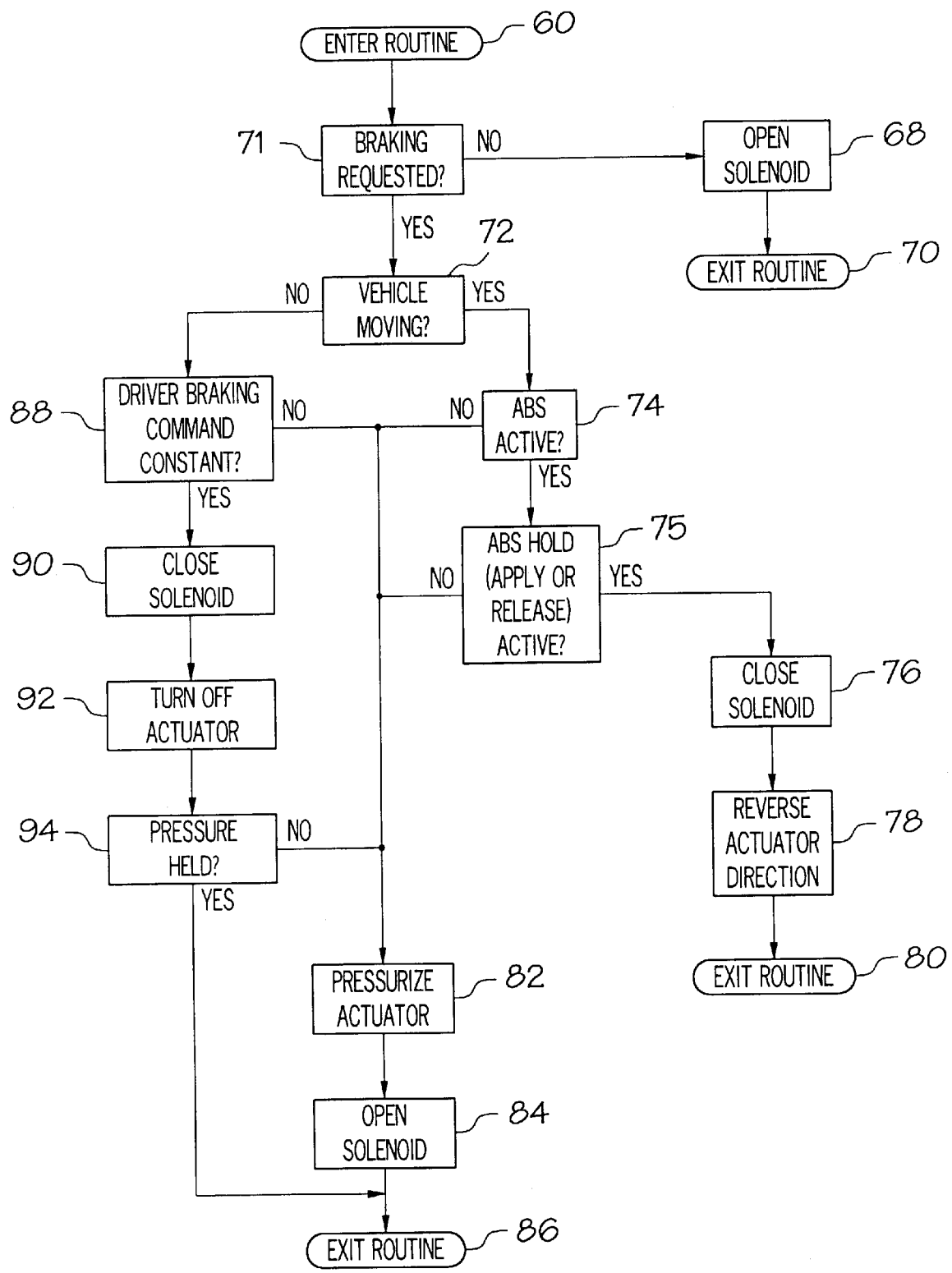
FIG. 4 is a flow chart showing the steps of the method of a preferred embodiment of the hydraulic system shown in FIG. 1.

As shown in FIG. 4, the routine is entered 60 and the controller 49 checks to see if a braking event is requested 71. If a braking event is not requested, the solenoid is opened 68 and the routine is exited 70. However, if a braking event is requested, a signal is sent to the brake controller 49 indicating whether or not the automobile is moving 72. If the signal indicates that the automobile is moving, it is determined if ABS is active 74. If ABS is active and a determination is made that ABS hold 75 is requested, meaning that a condition is sensed wherein it is desired that brake pressure be held constant, the solenoid valve 14 is closed 76 to maintain the current pressure at the brakes. Next, a signal is sent to the ballscrew piston motor 26 to reverse actuator direction 78 until the motor 26 is returned to the neutral position. The routine is then exited 80 and started again. However, if the brake controller 49 receives a signal that ABS hold is not active, the brake controller 49 regulates current to the ballscrew piston motor 26 to pressurize the actuator 82. The solenoid 14 remains open 84 so that the desired pressure is transmitted to the calipers 18. The routine is then exited 86 and started again.

In contrast, if the initial signal received by the brake controller 49 indicates that the automobile is not moving 72, the status of the driver braking command is checked 88. If the driver braking command is constant, the solenoid valve 14 is closed 90, thus holding the brake pressure at the desired constant level. The ballscrew piston motor 26 is then turned off 92. The pressure is then checked by the transducer 16 to see if it is actually being held constant 94. If the pressure is indeed being held constant, the routine is exited 86 and started again. However, if the pressure is not being held constant, the actuator is pressurized 82. Then the solenoid 14 is opened 84 and the routine is exited 86 and started again.

Figure 5:
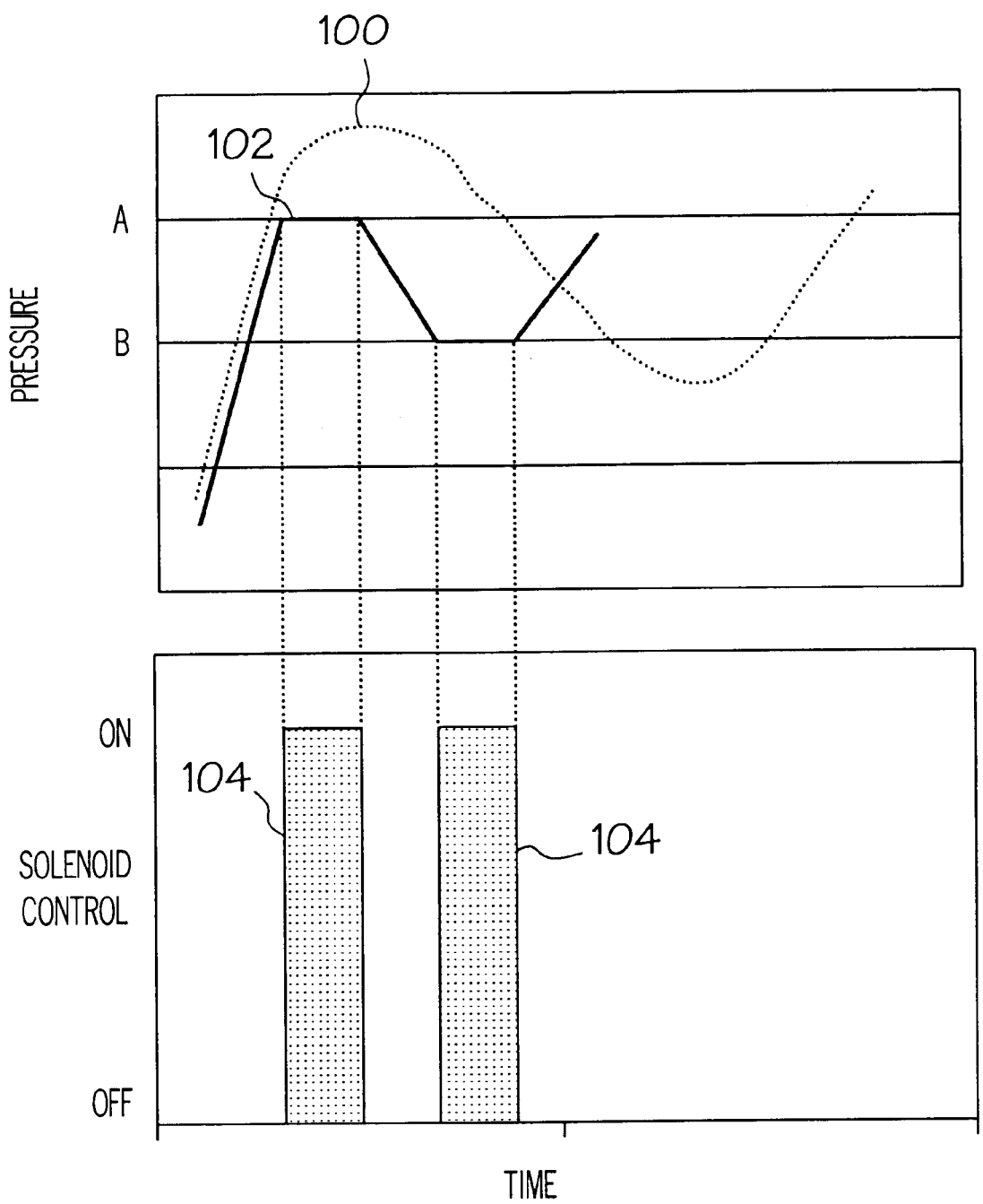
FIG. 5 is a graph of hydraulic pressure versus time during an ABS braking event in a prior art hydraulic braking system superimposed over a graph of an ABS braking event using the control of the present invention.

As shown in FIG. 5, during ABS operation of a prior-art motor based system, represented by line 100, there is a tendency to overshoot and undershoot the desired apply A and release pressures B to the wheel calipers. This results in less than optimum control of tire slip which can adversely effect stopping distance. Accordingly, the addition of the control of the present invention, represented by line 102, helps to eliminate this pressure overshoot and undershoot by holding the desired apply A and release B pressures constant almost instantaneously once the solenoid valve 14 is activated 104. As discussed earlier, this improved pressure control results in faster cycle times thereby improving overall ABS braking performance.

While the form of the apparatus herein described constitutes a preferred embodiment of the invention, it is to be understood that the invention is not limited to this precise form of apparatus, and that changes may be made therein without departing from the scope of the invention.

What is claimed is:

1. A method for controlling a hydraulic braking system adapted for use in a motor vehicle, the method comprising the steps of:

providing a hydraulic braking system having a pressure source comprising an electric motor and ball screw activated piston in fluid communication with a pressure sensor and a pressure actuated mechanism;

providing a normally open, solenoid actuated valve separating the pressure source from the pressure sensor and the pressure actuated mechanism;

with the solenoid activated valve open, activating the pressure source by actuating the electric motor and ball screw activated piston to increase pressure to the pressure actuated mechanism;

sensing that the pressure has reached a desired level using the pressure sensor;

activating and maintaining the solenoid actuated valve closed in response to the pressure reaching the desired level, thereby holding the pressure to the pressure actuated mechanism constant; and with the solenoid actuated valve closed, deactivating the pressure source by activating the electric motor and ball screw activated piston to reduce pressure between the solenoid activated valve and the pressure source.

2. The method of claim 1 wherein:

the pressure source is activated to produce the pressure with the solenoid actuated valve open in response to a braking request signal (1) when the vehicle is moving and no anti-lock braking is active and, alternatively, (2) when the vehicle is not moving and the braking request signal is not constant; and the solenoid activate valve is closed and the pressure source is deactivated with the braking request signal present when the pressure sensor indicates the desired level of pressure, the vehicle is not moving and the braking request signal is constant.

3. The method of claim 2 wherein:

the solenoid activated valve is closed and the pressure source is deactivated when the braking request signal is present, the pressure sensor indicates the desired level of pressure and an anti-lock braking pressure hold is active.

4. The method of claim 1 further comprising the step of reducing pressure to the pressure activated mechanism, when required, by deactivating the solenoid activated valve, with the pressure source already deactivated.

* * * * *